United States Patent [19]

Springmann et al.

[11] Patent Number: 5,240,486
[45] Date of Patent: Aug. 31, 1993

[54] CONDENSATE SEPARATOR

[75] Inventors: Thomas Springmann, Freiburg; Rolf Buerssner, Donaueschingen; Juergen Senn, Freiburg, all of Fed. Rep. of Germany

[73] Assignee: Testoterm Messtechnik GmbH & Co., Lenzkirch, Fed. Rep. of Germany

[21] Appl. No.: 821,740

[22] Filed: Jan. 17, 1992

[30] Foreign Application Priority Data

Jan. 21, 1991 [DE] Fed. Rep. of Germany ....... 4101194

[51] Int. Cl.⁵ .............................................. B01D 50/00
[52] U.S. Cl. ........................................ 55/320; 55/321; 55/463; 55/464
[58] Field of Search ................................. 55/462–465, 55/319, 320–323, 326

[56] References Cited

U.S. PATENT DOCUMENTS

| 1,405,259 | 1/1922 | Beach | 55/464 |
| 1,652,309 | 12/1927 | Kingdon | 55/322 |
| 2,048,956 | 7/1936 | Smith | 55/464 |
| 2,113,447 | 4/1938 | Hardinge | 55/462 |
| 2,952,331 | 9/1960 | Beach | 55/323 |

FOREIGN PATENT DOCUMENTS

| 1811800 | 6/1969 | Fed. Rep. of Germany . |
| 3814780A1 | 11/1988 | Fed. Rep. of Germany . |
| 3844456A1 | 7/1989 | Fed. Rep. of Germany . |

*Primary Examiner*—Charles Hart
*Attorney, Agent, or Firm*—Mason, Fenwick & Lawrence

[57] ABSTRACT

A condensate separator for separating liquids from gases comprises a tubular housing which is closed at each end by a body forming part of a flow element which extends into the tubular housing. The flow elements have axial bores, the bore of one flow element terminating in a transverse bore; the bore in the other flow element is an axial bore. In addition, filters are provided, preferably a coarse particle filter downstream of the inlet and a fine particle filter upstream of the outlet.

9 Claims, 1 Drawing Sheet

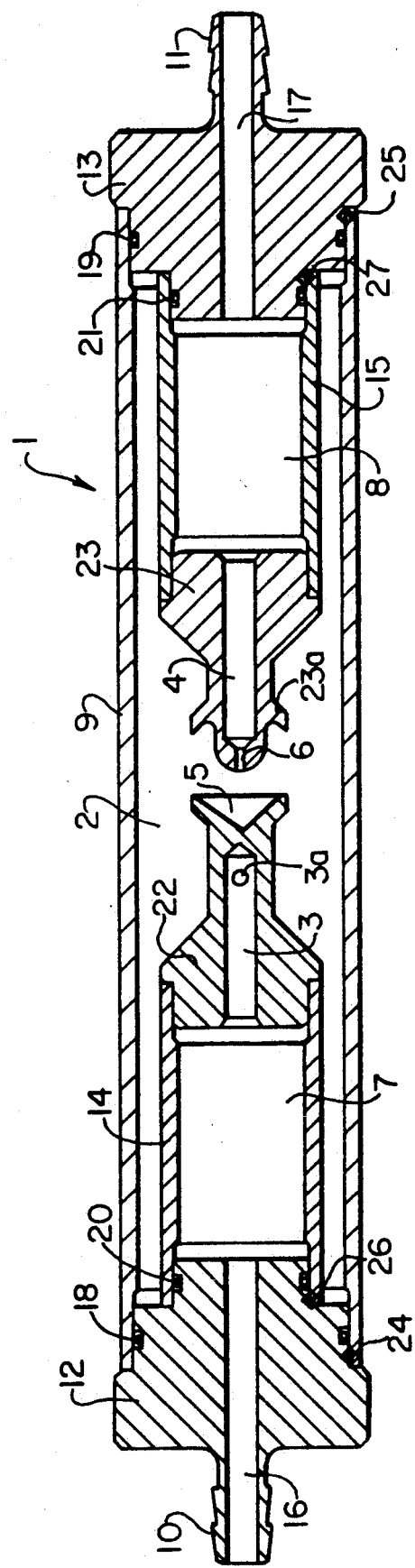

CONDENSATE SEPARATOR

FIELD OF THE INVENTION

The present invention relates to a condensate separator for separating liquids from gases, of the type comprising a gas inlet, a gas outlet and a sealed cavity.

BACKGROUND OF THE INVENTION

Condensate separators are required for numerous purposes during gas processing. In one condensate separator known from DE 38 14 780 A1, the gas stream is divided into two partial streams and the liquid is separated by means of a permeable tube and collected in a reservoir. A condensate separator of this kind is relatively complicated and moreover can only be operated in a vertical position.

Another condensate separator is known from DE 38 44 456 A1 in which a permeable membrane for separation of liquid and a reservoir for its collection are provided. This previously known separator also suffers from the above mentioned disadvantages.

An object of the present invention are to provide a condensate separator which is particularly easy to install, which and can be operated in any position.

SUMMARY OF THE INVENTION

According to the present invention, there is provided a condensate separator for separating liquids from gases which comprises a housing defining a cavity into which gas can enter through an inlet and from which gas can emerge through an outlet. Two gas flow elements are arranged in the cavity, each element defining a passageway for the flow of gas. A passage of the first flow element is in fluid communication with the cavity by means of a conduit extending substantially transversely to the axis of the passageway, and the first flow element has a funnel-shaped part at an end thereof facing the second flow element. A passage in the second flow element is directed towards the funnel-shaped part.

As a result of the change in direction of the gas flow, separation of the liquid is obtained in a simple manner. Separated liquid always collects in the cavity below the inlet and outlet openings without adversely effecting the flow of gas through the separator, and so the separator can be used in any position. The funnel-shaped end, which assists the change in direction of the gas flow, also prevents condensed liquid entering the facing axial bore in the second element.

Preferably, for operational purposes, the condensate separator has an annularly symmetrical structure.

A bevelled funnel-shaped enlargement which faces the first flow element is provided on the lateral surface of the second flow element, through which an axial bore passes, just behind the mouth of the axial bore. This prevents condensate entering into the axial bore or into the funnel-shaped end of the other element when the separator is vertical, with the axial bore directed downwards, since condensate deposited on the lateral surface of the flow control element drops off the edge of the funnel-shaped enlargement.

The separator can include filters, for which purpose preferably a coarse particle filter is provided on the inlet side and a fine particle filter is provided on the outlet side. In this way, a compact unit for gas filtration and condensate separation is obtained which can be mounted in any chosen location and arranged in any chosen position and which can be exchanged as soon as the filters are clogged or the condensate capacity of the cavity is reached.

For a better understanding of the present invention and to disclose how the same may be used, reference will now be made by way of example to the accompanying drawing.

BRIEF DESCRIPTION OF THE DRAWING

The single FIGURE shows a longitudinal cross-section of a condensate separator in accordance with the present invention.

DESCRIPTION OF THE PREFERRED EMBODIMENTS

A substantially symmetrically constructed separator 1 comprises two bodies 12, 13 which are in axial alignment with and are connected by a tubular housing 9. Both bodies 12, 13 comprise outwardly projecting connecting elements 10, 11 and central bores 16, 17 pass through them for introducing gas and exhausting gas. Two step-shaped recessed sections with smaller diameters are provided on the bodies 12, 13 on the sides toward the middle of the housing. The tubular housing 9 bears against the first section 24 and 25, respectively. rings 18 and 19 are provided for sealing the tubular housing 9 against the bodies.

A cylindrical filter 7, 8 bears against the end of each body 12, 13 and each of the filters is held towards the inside of the housing by respective terminal elements 22, 23 which are of elongate tapered or cone-shape and extend towards the middle of the housing. The filters 7 and 8, bodies 12 and 13 and terminal elements 22 and 23 are all connected by a small outer covering tube, 14 or 15 respectively, which bears against the second step-shaped recessed section 26 or 27 respectively of the appropriate body and is sealed against the body by means of an O-ring 20 or 21 respectively; each of these assemblies is a flow element.

The filter 7 or 8 which on the inlet side is constructed is a coarse particle filter, whereas the other filter 7, 8 which is on the outlet side is a fine particle filter.

Each of the two terminal elements 22 and 23 comprises a bore, 3 or 4, respectively, the diameter of which corresponds with the diameter of the central bores 16, 17 in the bodies 12, 13. In the case of the first terminal element 22, the bore 3 connects with the cavity 2 inside the separator 1 through a transverse bore 3a. In the case of the second terminal element 23, the bore 4 communicates with the cavity 2 by an axial bore 6 having a smaller cross-section.

The first terminal element 22 comprises a funnel-shaped end 5 which faces the oppositely located axial bore in the second terminal element 23, and which is axially beyond transverse bore 3a, so that gas passing from the transverse bore 3a will not impinge upon the funnel-shaped end 5. The second terminal 23 comprises a cylindrical end portion, rounded off at the end,- through which the central axial bore 6 passes. Just behind the axial bore 6 which opens into the cavity 2, a bevelled, funnel-shaped enlargement 23, which faces towards the first terminal element 22, is provided on the lateral surface of the second terminal element 23.

Gas from which condensate is to be separated by the present invention condensate separator may enter into either the connecting element 10 or the connecting element 11. Further, the condensate separator 1 may be used in substantially any position, horizontal, vertical or positions in between, and in any position, either end of the condensate separator 1 may be the inlet end, with the other end being the outlet end.

If gas enters the body 12, it will pass through the filter 7, and be discharged through the transverse bore 3a. The gas will then swirl around, depositing water, and will, after substantial changes of direction, enter the bore 6, and then pass outwardly of the separator 1 through bore 4, filter 8 and the body 13. Conversely, if gas is introduced into the body 13, it will be discharged from the bore 6, and be deflected by the funnel-shaped end 5, change direction, and enter the transverse bore 3a, and then pass through bore 3, filter 7 and the body 12.

If the separator 1 is oriented with the body 12 elevated relative to the body 13, any liquid condensate on the exterior of the terminal element 22 will be prevented from entering the bore 6 by the funnel-shaped end 5. Conversely, if the body 13 is higher than the body 12, any condensate on the flow element including the stopper 13, small tube 15 and terminal element 23 will be caused by the funnel-shaped enlargement 23 to be deflected outwardly and will not reach the transverse bore 3a.

In any position of the separator 1, condensate will be prevented from entering either of the flow elements from the cavity 2.

All the individual elements of the separator may advantageously be made of plastic, and in this case use of a transparent material for the tubular cover provides advantages for monitoring purposes. When the separator is to be used for reactive gases, the elements can advantageously be made of polytetrafluoroethylene (PTFE), and the tubular cover 9 may be a resistant glass, for example quartz glass.

We claim:

1. A condensate separator for separating liquids from gases comprising:

a housing defining a cavity, a first flow element extending into said housing and having a passage therein for receiving gas to be admitted into said housing, said first flow element having a transverse discharge portion in fluid communication with the passage therein and with the cavity, a second flow element extending into said housing and having a passage therein for receiving gas admitted into said housing by said first flow element and for discharging gas from said housing, said passage of said second flow element having an axially extending terminal portion, and said first flow element having an end in said housing, and a funnel-shaped part at said end of said first flow element in facing relation to the axially extending terminal portion of said second flow element, said funnel-shaped part being axially beyond said transverse discharge portion.

2. A separator as claimed in claim 1, having a substantially annular symmetrical structure.

3. A separator as claimed in claim 1, wherein said second flow element has on its lateral surface a bevelled funnel-shaped projection which faces said first flow element.

4. A separator as claimed in claim 1, wherein at least one filter is arranged inside the housing in the flow path of the gas between the inlet and the outlet.

5. A separator as claimed in claim 4, wherein a coarse particle filter is provided in said first flow element and a fine particle filter is provided in said second flow element.

6. A separator as claimed in claim 5, wherein each flow element comprises a body, a tube and a terminal element, and each filter is between a respective body and the associated terminal element and is within a said tube.

7. A separator as claimed in claim 1, wherein the housing is tubular and said flow elements extend into opposite ends of said housing 8. A separator as claimed in claim 7, wherein each flow element comprises a body, a tube and a terminal element, and wherein each body and each terminal element comprises a stepped portion for fitting into a said tube.

9. A separator as claimed in claim 1, wherein said first and second flow elements extend substantially coaxially towards each other centrally of the cavity.

* * * * *